United States Patent
Lu

[11] Patent Number: 6,127,968
[45] Date of Patent: Oct. 3, 2000

[54] ON-THE-FLY RTK POSITIONING SYSTEM WITH SINGLE FREQUENCY RECEIVER

[75] Inventor: Gang Lu, Cupertino, Calif.

[73] Assignee: Trimble Navigation Limited, Sunnyvale, Calif.

[21] Appl. No.: 09/015,494

[22] Filed: Jan. 28, 1998

[51] Int. Cl.[7] .................................................. G01S 5/02
[52] U.S. Cl. .............................. 342/357.03; 342/357.06; 701/1
[58] Field of Search ........................ 342/357.01, 357.02, 342/357.03, 357.04, 357.05, 357.06, 357.07, 357.08, 357.09, 357.1, 357.11, 357, 12, 357.13, 357.14, 357.15, 357.16, 357.17

[56] References Cited

U.S. PATENT DOCUMENTS

| 5,177,489 | 1/1993 | Hatch | 342/357 |
| 5,359,521 | 10/1994 | Kyrtsos et al. | 342/357.06 |
| 5,519,620 | 5/1996 | Talbot et al. | 342/357.06 |
| 5,543,804 | 8/1996 | Buchler et al. | 342/357.08 |
| 5,825,326 | 10/1998 | Semler et al. | 342/357 |

*Primary Examiner*—Thomas H. Tarcza
*Assistant Examiner*—Fred H. Mull
*Attorney, Agent, or Firm*—Boris G. Tankhilevich

[57] ABSTRACT

A system for single frequency on-the-fly (OTF) real-time kinematic (RTK) centimeter level position determination using the satellite positioning system (SATPS) is disclosed. The system includes a storage buffer used for storing data. The stored data and the current data are used by an ambiguity search algorithm for the improved integer ambiguity resolution.

18 Claims, 6 Drawing Sheets

IDEALLY, CARRIER PHASE PLANES
INTERSECT AT ONLY ONE POINT

FIG._7

BUT WITH INCREASED MULTIPATH AND LARGER
UNCERTAINTY BOUNDS, THE RIGHT ANSWER BECOMES LOST

ON-THE-FLY RTK POSITIONING SYSTEM WITH SINGLE FREQUENCY RECEIVER

BACKGROUND

The invention relates to a centimeter accurate global positioning system receiver for on-the-fly (OTF) real-time kinematic (RTK) measurement. The satellite positioning system (SATPS) can include different satellite systems or combinations of the satellite systems. One of those systems is a global positioning system (GPS).

The GPS is a system of satellite signal transmitters, with receivers located on the Earth's surface or adjacent to the Earth's surface, that transmits information from which an observer's present location and/or the time of observation can be determined. There is also the Global Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2=1227.6 MHz (twenty-four centimeter carrier wavelength). These two frequencies are integral multiplies f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=10.23 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=1,2, . . . 24) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, to any other compatible satellite-based system, or combination of satellite systems that can provide information by which an observer's position and the time of observation can be determined, all of which meet the requirements of the present invention.

A Satellite Positioning System (SATPS), such as the Global Positioning System (GPS), the Global Navigation Satellite System (GLONASS), or the combination of GPS and GLONASS systems uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta$ti), wherein ($\Delta$ti) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

After the SATPS receiver determines the coordinates of the i-th SATPS satellite by picking up transmitted ephemeris constants, the SATPS receiver can obtain the solution of the set of the four equations for its unknown coordinates ($x_0$, $y_0$, $z_0$) and for unknown time bias error (cb). The SATPS receiver can also obtain its heading and speed. (See *The Navstar Global Positioning System,* Tom Logsdon, Van Nostrand Reinhold, 1992, pp. 8–33, 44–75, 128–187.) The following discussion is focused on a GPS receiver, though the same approach can be used for a GLONASS receiver, for a GPS_GLONASS combined receiver, or any other SATPS receiver.

When originally put into operation by the United States Government, the GPS was not intended to provide a civilian user with centimeter-level position accuracies. However, centimeter-level position accuracies are now required for such civilian applications as surveying, mapping, etc.

Extremely accurate GPS receivers depend on phase measurements of the radio carriers that they receive from various orbiting GPS satellites. Less accurate GPS receivers simply develop the pseudoranges to each visible satellite based on the time codes being sent. Within the granularity of a single time code, the carrier phase can be measured and used to compute range distance as a multiple of the fundamental carrier wavelength. As was stated above, GPS signal transmissions are on two synchronous, but separate carrier frequencies L1 and L2, with wavelengths of nineteen and twenty-four centimeters, respectively. Thus, within nineteen or twenty-four centimeters, the phase of the GPS carrier signal will change 360° degrees.

For the high accuracy measurement, the number of whole cycle carrier phase shifts between a particular GPS satellite and the GPS receiver should be resolved because at the receiver every cycle will appear the same. Thus, there is an "integer ambiguity", that is the problem of determining the number of whole cycles of the carrier satellite signal between the GPS satellite being observed and the GPS receiver. The error in one carrier cycle L1 (or L2) can change the measurement result by 19 (or 24) centimeters, which is an unacceptable error for the centimeter-level accuracy measurements.

The computational resolution of the integer ambiguity has traditionally been an intensive arithmetic problem for the computers used to implement GPS receivers. The traditional approaches to such integer ambiguity resolution have prevented on-the-fly (OTF) measurement updates for moving GPS receivers with centimeter accurate outputs. Such highly accurate GPS receivers have often required long periods of motionlessness to produce a first and subsequent position fix.

There are numerous prior art methods for resolving integer ambiguities. These methods include integer searches, multiple antennas, multiple GPS observables, motion-based approaches, and external aiding. However, all these prior art methods involve the usage of highly sophisticated and expensive satellite reception equipment.

What is needed is the simplified and inexpensive apparatus that would allow one to perform the OTF RTK position determination measurements of a rover unit.

SUMMARY

The present invention is unique because it allows one to perform the OTF RTK position determination measurements of a rover unit by utilizing a single frequency inexpensive GPS receiver modified to include a storage device, a double difference circuit, and an integer ambiguity circuit.

One aspect of the present invention is directed to an on-the-fly real-time kinematic (OTF-RTK) system for use with the satellite positioning system SATPS.

In one embodiment, the system comprises: (a) a base including a base SATPS satellite navigation receiver and a base measurement means; (b) a rover unit including a rover SATPS satellite navigation receiver and a rover measurement means; (c) a Double-Difference (DD) Kalman Filter; (d) a storage device including a storage buffer; and (e) an integer ambiguity algorithm processor.

In another embodiment, the system comprises: (a) a rover unit including a rover SATPS satellite navigation receiver and a rover measurement means; (b) a Double-Difference (DD) Kalman Filter; (c) a storage device including a storage buffer; and (d) an integer ambiguity algorithm processor.

The base positioned in a fixed location with known coordinates, receives SATPS satellite signals from the SATPS satellite system, performs its own single frequency code and carrier phase measurements, and transmits the base single frequency code and carrier phase measurements to the rover unit.

The rover unit receives SATPS satellite signals from the SATPS satellite system, receives the base single frequency code and carrier phase measurements, and performs its own single frequency code and carrier phase measurements.

The DD Kalman Filter receives at each epoch the base and the rover single frequency code and carrier phase measurements synchronized at each epoch. The DD Kalman Filter calculates single frequency DD code phase and DD carrier phase quantities and performs Kalman filtering operation on the DD quantities.

The storage device receives and stores in the storage buffer at a specified epoch interval the single frequency DD carrier phase quantities starting at an epoch corresponding to the beginning of the measurements and ending at an epoch when the storage buffer is full.

The integer-ambiguity resolution algorithm processor performs the ambiguity search utilizing the current and the stored DD carrier quantities to determine a position fix and integer ambiguities for the rover unit.

Finally, the navigation computer provides a user with near-continuous position estimates of the rover unit with centimeter-level accuracy.

In one embodiment, the system further includes a base transmitter, an communication rover receiver, and a communication link between the base and the rover unit for communicating the single frequency code and carrier phase measurement and the base fixed location coordinates from the base to the rover unit.

In one embodiment, the rover unit also includes a datum transformation circuit configured to generate centimeter-level accurate position fixes in a local coordinate format from the near-continuous position estimates of the rover unit, and an ellipsoid-to-geoid conversion circuit configured to generate locally corrected height information from the near-continuous position estimates of the rover unit.

In one embodiment, the rover unit can include a GPS satellite navigation receiver configured to receive GPS satellite signals from the GPS satellite system.

In another embodiment, the rover unit can include a GLONASS satellite navigation receiver configured to receive GLONASS satellite signals from the GLONASS satellite system.

Yet, in one more embodiment, the rover unit include a combined GPS_GLONASS satellite navigation receiver configured to receive satellite signals from both the GPS and GLONASS satellite systems.

Another aspect of the present invention is directed to a method for on-the-fly real-time kinematic (OTF-RTK) position estimation of a rover unit.

In one embodiment, the method comprises the following steps: (a) receiving SATPS satellite signals from a SATPS satellite system by a base receiver; (b) performing single frequency code and carrier phase measurements by the base located in a fixed position with known coordinates; (c) transmitting the single frequency code and carrier phase measurements from the base to the rover unit; (d) receiving SATPS satellite signals from the SATPS satellite system by the rover unit; (e) receiving the single frequency base code and carrier phase measurements; (e) performing single frequency code and carrier phase measurements at the rover unit; (f) calculating at each synchronized epoch a single frequency DD code phase and DD carrier phase quantities; (g) performing Kalman filtering operation DD quantities; (h) receiving and storing in a storage device including a storage buffer at a specified epoch interval the single frequency DD carrier phase quantities starting at an epoch corresponding to the beginning of the measurements and ending at an epoch when the storage buffer is full; (i) performing an ambiguity search to determine the position fix and integer ambiguities for the rover unit by using current and stored single frequency DD carrier phase quantities by utilizing an integer-ambiguity resolution algorithm processor; and (k) providing a user with near-continuous position estimates of the rover unit with centimeter-level accuracy by utilizing a navigation computer.

In another embodiment, the method comprises the following steps: (a) receiving SATPS satellite signals from the SATPS satellite system by the rover unit; (b) receiving the single frequency base code and carrier phase measurements; (c) performing single frequency code and carrier phase measurements at the rover unit; (d) calculating at each synchronized epoch a single frequency DD code phase and DD carier phase quantities; (e) perfroming Kalman filtering operation D quantities; (f) receiving and storing in a storage device including a storage buffer at a specified epoch interval the single frequency DD carrier phase quantites starting at an epoch corresponding to the beginning of the measurements and ending at an epoch when the storage buffer is full; (g) performing an ambiguity search to determine the posotion fix and integer ambiguities for the rover unit by using current and stored single frequency DD carrier phase quantities by utilizing an integer-ambiguity resolution algorithm processor; and (h) providing a user with near-continuous position estimates of the rover unit with centimeter-level accuracy by utilizing a navigation computer.

FULL DESCRIPTION OF THE PREFERRED EMBODIMENTS

Figure 1:
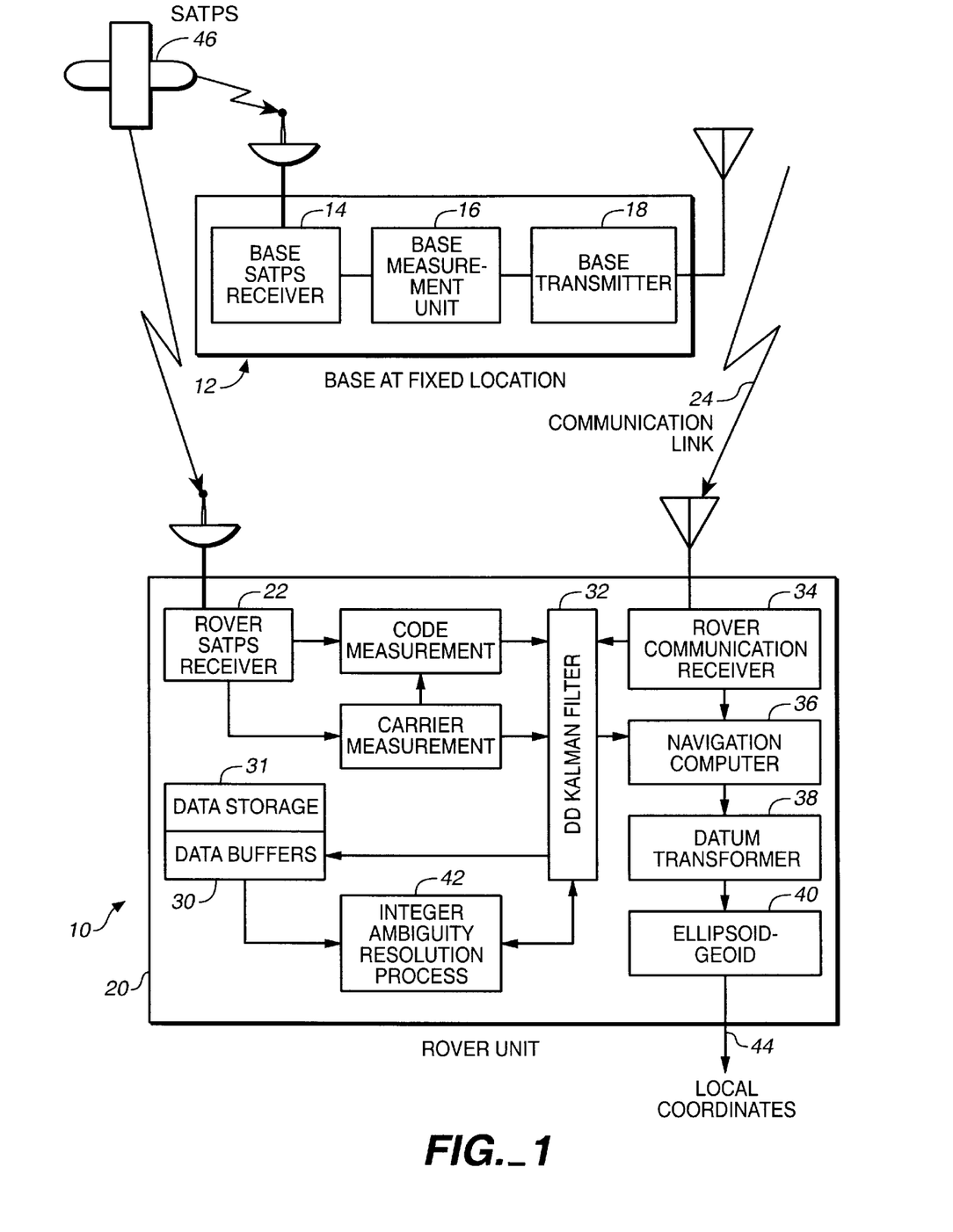
FIG. 1 depicts the on-the-fly (OTF) real-time-kinematic (RTK) system of the present invention.

FIG. 1 depicts an on-the-fly (OTF) real-time-kinematic (RTK) system of the present invention.

In one embodiment, the system (10) includes a base station (12), a rover unit (20), and a communication link (24) between the rover unit and the base station.

In another embodiment, the system includes only a rover unit (20).

The base (12) is located at the fixed position with precisely known coordinates. The rover (20) is a moving kinematic object whose position fixes the system (10) of the present invention is designed to determine: (1) in real time and almost instantly, that is on-the-fly (OTF), and (2) very precisely, that is with centimeter accuracy, after the integer ambiguity is resolved.

Both base (12) and rover (20) include a satellite positioning system (SATPS) receiver (14) and (22) respectively. Both base and rover SATPS receiver are configured to receive the satellite signals emanating from a satellite positioning system (SATPS) (46).

In one embodiment, the SATPS system can include a GPS system, and the SATPS receivers (14) and (22) include GPS receivers.

In another embodiment, the SATPS system can includes a GLONASS system, and the SATPS receivers (14) and (22) include GLONASS receivers.

Yet, in one more embodiment, the SATPS system can include a combined GPS_GLONASS system, and the SATPS receivers (14) and (22) include combined GPS_GLONASS receivers.

In one embodiment, both the base GPS receiver and the rover GPS receiver can be implemented by utilizing a single frequency 4600 LS GPS TRIMBLE receiver.

In another embodiment, the rover GPS receiver can be implemented by utilizing a single frequency 4600 LS GPS TRIMBLE receiver.

The rover unit (20) further includes a Double-Difference (DD) Kalman Filter (32) configured to receive at each epoch the base single frequency code and carrier phase measurements. The rover unit also performs the single frequency code and carrier phase measurements. The base and the rover measurements are synchronized at each epoch. The DD Kalman Filter (32) is configured to calculate a single frequency DD code phase and DD carrier phase quantities and to perform Kalman filtering operation on the DD code and carrier quantities.

The rover unit (20) of FIG. 1 further includes a storage device (31) including a storage buffer (30). The storage device is configured to receive and to store in the storage buffer at a specified epoch interval the single frequency DD carrier phase quantities starting at an epoch corresponding to the beginning of the measurements and ending at an epoch when the storage buffer is full.

In one embodiment, the storage buffer can be implemented using a 100 KByte buffer. In this embodiment, the storage device can store the single frequency DD carrier phase measurements at each epoch.

In another embodiment, the storage buffer can be implemented using a 10 KByte buffer. In this embodiment, the storage device can store the single frequency DD carrier phase measurements at every 10 epochs.

The rover unit further includes an integer-ambiguity resolution algorithm processor (42 of FIG. 1). The integer-ambiguity resolution algorithm processor is configured to perform an ambiguity search utilizing current and stored single frequency DD carrier phase quantities. See full discussion below.

A navigation computer (36) is configured to provide a user with near-continuous position estimates of the rover unit with centimeter-level accuracy.

In the preferred embodiment, the system (10) of FIG. 1 further includes a base transmitter (18) configured to transmit the base single frequency code and carrier phase measurements to the rover unit. The system (10) also includes a communication rover receiver (34) configured to receive from the base the single frequency code and carrier phase measurements utilizing a communication link (24) between the base and the rover unit.

On one embodiment, the rover (20) also includes a datum transformation circuit (38) configured to generate centimeter-level accurate position fixes in a local coordinate format from the near-continuous position estimates of the rover unit. The rover (20) can also include an ellipsoid-to-geoid conversion circuit (40) configured to generate locally corrected orthometric (in reference to geoid) height information from the near-continuous position estimates of the rover unit.

In one embodiment, the on-the-fly (OTF) real time kinematic (RTK) system (10) of FIG. 1 performs the following steps.

At first, the base GPS receiver (14) receives GPS satellite signals from a GPS satellite system. The base (12) is placed in a fixed location with known coordinates.

Next, the base measurement unit (16 of FIG. 1) performs single frequency code and carrier phase measurements and transmits the single frequency code and carrier phase measurements to the rover unit (20 of FIG. 1).

After receiving GPS satellite signals from the GPS satellite system utilizing the rover GPS receiver (22) and after receiving the base single frequency code and carrier phase measurements using the rover communication receiver (34), the Kalman filter (32) calculates double difference (DD) carrier and code phase quantities at each synchronized epoch and performs the Kalman filtering operation on these DD code and carrier quantities.

The storage device (31 of FIG. 1) receives and stores in a storage buffer (30) at a specified epoch interval the single frequency DD carrier phase quantities starting at an epoch corresponding to the beginning of the measurements and ending at an epoch when the storage buffer is full.

The integer ambiguity processor (42 of FIG. 1) performs the ambiguity search by using current and stored single frequency DD carrier phase quantities in order to obtain the rover's position fixes and floating ambiguities.

Finally, the navigation computer (36) provides a user with near-continuous position estimates of the rover unit with centimeter-level accuracy.

In another embodiment, the on-the-fly (OTF) real time kinematic (RTK) system of the present invention includes only the rover (20 of FIG. 1) and performs the following steps.

The rover receives the GPS satellite signals from the GPS satellite system utilizing the GPS receiver (22) and receives the base single frequency code and carrier phase measurements using the rover communication receiver (34).

The Kalman filter (32) calculates double difference (DD) carrier and code phase quantities at each synchronized epoch and performs the Kalman filtering operation on the obtained DD code and carrier quantities.

The storage device (31 of FIG. 1) receives and stores in a storage buffer (30) at a specified epoch interval the single frequency DD carrier phase quantities starting at an epoch corresponding to the beginning of the measurements and ending at an epoch when the storage buffer is full.

The integer ambiguity processor (42 of FIG. 1) performs the ambiguity search by using current and stored single frequency DD carrier phase quantities in order to obtain the rover's position fixes and floating ambiguities.

Finally, the navigation computer (36) provides a user with near-continuous position estimates of the rover unit with centimeter-level accuracy.

In the preferred embodiment, the single frequency is an L1 GPS frequency. In another embodiment, the single frequency is an L2 GPS frequency. Yet, in one more embodiment, the single frequency is an L3 GPS frequency.

At first we discuss the double difference (DD) Kalman Filter (32) that constitutes a very important piece of the system (10) of the present invention.

The Kalman filter is well described by Arthur Gelb in the book "Applied Optimal Estimation", published in 1974 by the M. I. T. Press, Cambridge, Mass., pp. 103–127 and 146.

The development of data processing methods for dealing with random variables was first suggested by Gauss, who invented the technique of deterministic least-squares. Wiener, using random process theory, developed a procedure for the frequency domain design of statistically optimal filters. Kalman used the optimal recursive filter techniques based on state-space, time domain formulations. This approach is known as Kalman filter, and is very well suited for digital computer implementation. Kalman filter is a recursive solution to Gauss original least-squares problem. A recursive solution enables one to do sequential, rather than batch, processing of the measurement data.

An optimal estimator is a computational algorithm. This algorithm utilizes measurements to obtain a minimum error estimate of the state of a system. The optimal estimator algorithm does that by utilizing knowledge of system and measurement dynamics, assumed statistics of system noises and measurement errors, and initial condition information.

When the time at which an estimate is taken coincides with the last measurement point, we deal with the filtering problem.

Figure 2:
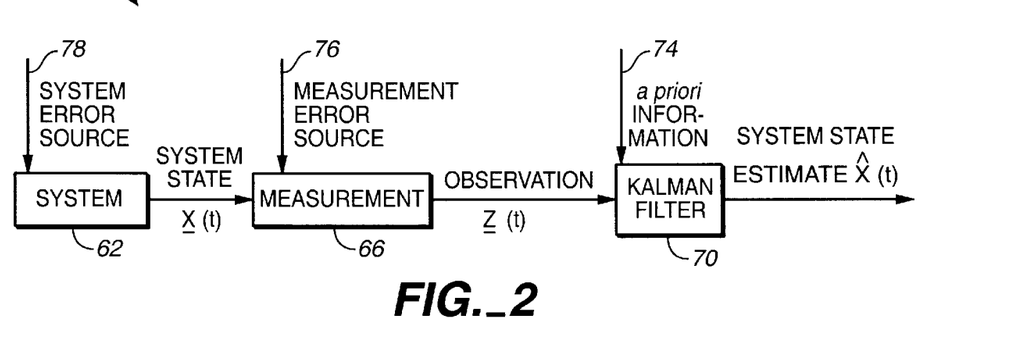
FIG. 2 shows the block diagram of the system, measurement, and estimator.

FIG. 2 is an illustration of the block diagram (60) of the optimal Kalman estimator (70) of the linear system (62). Given a linear system model ($x_k = \Phi_{k-1} x_{k-1} + w_{k-1}$), and any measurements (66) of its behavior ($z_k = H_k x_k + \epsilon_k$), plus statistical models which characterize system errors (78) (Cov($w_k$)=$Q_k$), and statistical models which characterize measurement errors (76) (Cov($\epsilon_k$)=$R_k$), plus initial condition information (E[x(0)]=$x_0$; Cov(x(0))=$P_0$), and other assumptions (E[$w_k \epsilon_j$]=0 for all j,k), the Kalman filter describes how to process the measurement data.

Specifically, the Kalman filter predicts the following variables (72):
State Estimate Prediction:

$$x_k(-) = \Phi_{k-1} x_{k-1}(+); \quad (1)$$

Error Covariance Prediction:

$$P_k(-) = \Phi_{k-1} P_{k-1}(+) \Phi_{k-1}^T + Q_{k-1}; \quad (2)$$

Predicted Residuals:

$$r_k(-) = z_k - H_k x_k(-); \quad (3)$$

Error Covariance Update in a Bayesian form:

$$P^{-1}_k(+) = P^{-1}_k(-) + H_k^T R_k^{-1} H_k; \quad (4)$$

State Vector Update in a Bayesian form:

$$x_k(+) = x_k(-) + P_k(+) H_k^T R_k^{-1} r_k(-); \quad (5)$$

a posterior Residuals:

$$r_k(+) = z_k - H_k x_k(+). \quad (6)$$

Here, $x_k$ is the state vector at time $t_k$, with dimension n×1; $\Phi_{k-1}$ is the transition matrix with dimension n×n; $w_k$ is the system process noise vector; $Q_k$ is the covariance matrix of $w_k$; $z_k$ is the measurement vector made at time $t_k$; $H_k$ is the design matrix, which relates the state vector $x_k$ to the measurements $z_k$; $\epsilon_k$ is the measurement noise vector; $R_k$ is the covariance matrix of the measurement noise $\epsilon_k$; E is the mathematical expectation; $x_0$ is the initial value of the state vector; $P_0$ is the initial covariance matrix for $x_0$; $x_k(-)$ is the predicted state vector value at time $t_k$; $P_k(-)$ is the predicted covariance matrix for $x_k(-)$; $r_k(-)$ is the predicted residuals at time $t_k$, computed based on $x_k(-)$; $P_k(+)$ is the updated covariance matrix at time $t_k$; $x_k(+)$ is the updated state vector value at time $t_k$; and $r_k(+)$ is the a posteriori (filtered) residuals at time $t_k$.

Least squares (LS) parameter estimation can be considered as a special case of the Kalman filter. In LS model of the Kalman filter, the measurement noise is considered to be small compared with the system noise, that is, we assume that $P_k^{-1}(-) = 0$ (i.e. $P_k(-) = \infty$) at every epoch $t_k$. The Kalman filter state vector updates then become the LS parameter estimation. In LS model we have the following formulas:
Measurement model:

$$z_k = H_k x_k + \epsilon_k; \; Cov(\epsilon_k) = R_k; \quad (7)$$

Initial state vector value:

$$x_k(-) = x_k^0; \quad (8)$$

Predicted residuals:

$$r_k(-) = z_k - H_k x_k(-); \quad (9)$$

LS Error Covariance Update:

$$P^{-1}_k(+) = H_k^T R_k^{-1} H_k; \quad (10)$$

LS State Vector Update:

$$x_k(+) = x_k(-) + P_k(+) H_k^T R_k^{-1} r_k(-); \quad (11)$$

a posterior Residuals:

$$r_k(+) = z_k - H_k x_k(+); \quad (12)$$

Here, $x_k^0$ is the initial approximate value assumed for $x_k$ at time $t_k$. The meaning of setting $P_k^{-1}(-)=0$ in LS estimation is that we disregard or have no a priori (predicted) information about the accuracy of the initial state vector $x_k^0$. The LS solution $x_k(+)$ satisfies the condition that the weighted sum of the squares of the resultant a posteriori residuals is minimum, i.e. $r_k^T(+) R_k^{-1} r_k(+) \to$ minimum.

As was stated above, most GPS receivers can provide two basic types of measurements, i.e. pseudo-ranges and carrier phases. A pseudo-range measurement can be viewed as an unambiguous distance from a GPS satellite to the tracking receiver antenna center. This distance contains satellite and receiver clocks errors, and thus called pseudo-range. The receiver measuring noise on pseudo-range measurement is typically at 30 cm to 1 meter level for high quality land survey receivers. The carrier phase measurement is "the integrated Doppler" measured over a GPS carrier frequency (L1 or L2). At the first epoch the receiver locks onto a satellite, it can only measure the fractional part of the received carrier wave. The number of whole cycles (N) of the carrier wave from the GPS satellite to the receiver is unknown. As long as the receiver keeps tracking of the GPS carrier signal (without loss of lock), the phase measurement (i.e. the integrated Doppler) provides a precise total range change between the current epoch and the initial epoch. For this reason, carrier phase measurements are sometimes called accumulated delta range (ADR) observations in some literature. Without loss of lock on the carrier signal from a satellite, all the carrier phase observations made by the receiver for that satellite will have the same initial integer carrier phase ambiguity, N. A loss of lock of the GPS carrier signal will therefore result in a new carrier phase ambiguity for the carrier phase observations made after the signal re-acquisition. The receiver measuring noise for carrier phase is usually within 0.005 cycles, that is about 1 millimeter, when scaled by carrier wavelength. If somehow the initial carrier phase ambiguity, N, can be determined, carrier phase measurements would become very precise unambiguous range measurements capable of providing centimeter-level positioning and navigation accuracy.

Carrier phase and pseudo-range measurements made by a single receiver contain receiver clock errors, satellite clock errors, tropospheric effect, ionospheric effect, satellite orbit errors, receiver measuring noise and multipath errors. By a method called double differencing (DD) between the pseudo-ranges (or carrier phases) collected by two receivers over a short baseline, no more than 10 km, all the above mentioned error terms except measuring noise and multipath errors are either canceled out or reduced to a negligible amount. For the simplicity of discussions, all the error terms except for the receiver measuring noise are omitted in the given measurement equations. Since carrier phase ambiguity resolution and centimeter-level real-time positioning using L1 GPS measurements are based on DD pseudo-range and carrier phase observations, the omission of the above mentioned error terms does not effect the derived results and conclusions in this invention.

Figure 3:
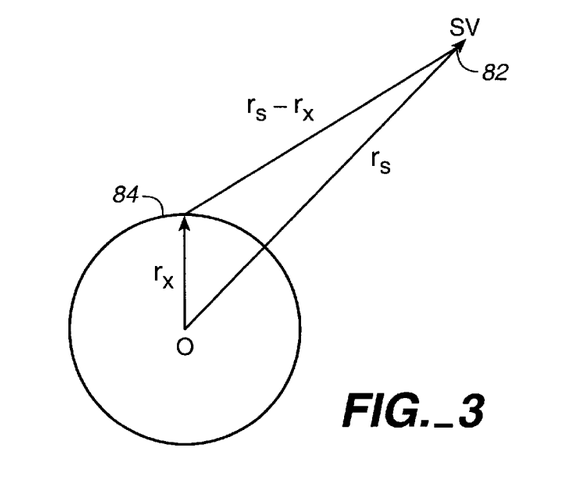
FIG. 3 illustrates a single measurement geometry for one receiver and one satellite for a pseudo-range observation equation.

According to "Guide to GPS Positioning" by D. Wells, published by Canadian GPS Associates in 1986, and "Global Positioning System: Theory and Applications" by B. Parkinson, published by the American Institute of Aeronautics and Astronautics, in 1996, the pseudo-range observation equation for a single measurement:

$$p=\|r_s-r_x\|+\epsilon_p. \qquad (13)$$

Carrier phase observation equation for a single measurement is:

$$-\Phi=\|r_s-r_x\|/\lambda+N+\epsilon_{101}; \qquad (14)$$

where $r_x=(x_r, y_r, z_r)^T$ is the receiver coordinates (84 of FIG. 3), $r_s=(x_s, y_s, z_s)^T$ is the satellite coordinates (82 of FIG. 3), $\|.\|$ is Euclid norm, p is the pseudo-range measurement, $\epsilon_p$ is the pseudo-range measurement noise, $\Phi$ is the carrier phase measurement in cycles, $\lambda$ is the carrier wavelength (19.02 cm for GPS L1 frequency), N is the integer carrier phase cycle ambiguity and $\epsilon_\Phi$ is the carrier phase measurement noise.

Equations (13) and (14) are non-linear with respect to receiver coordinates $r_x=(x_r, y_r, z_r)^T$. But the ambiguity parameter N is linearly related to carrier phase measurement $\Phi$ as shown in Eqn. (14). Satellite coordinates $r_s=(x_s, y_s, z_s)^T$ are known from satellite broadcast ephemeris. In order to estimate the receiver coordinates $r_x=(x_r, y_r, z_r)^T$, we usually linearize Equations (13) and (14) about some nominal (or a priori) receiver coordinates $r_{x0}=(x_{r0}, y_{r0}, z_{r0})^T$. The linearized forms for Equations (13) and (14) are:

$$p=a\delta x_r+b\delta y_r+c\delta z_r+\rho_0+\epsilon_p; \qquad (15)$$

$$-\Phi=(a/\lambda)\delta x_r+(b/\lambda)\delta y_r+(c/\lambda)\delta z_r+N+\rho_0/\lambda+\epsilon_\Phi; \qquad (16)$$

where $a=-(x_s-x_{r0})/\rho_0$, $b=-(y_s-y_{r0})/\rho_0$, $c=-(z_s-z_{r0})/\rho_0$, $\rho_0=[(x_s-x_{r0})^2+(y_s-y_{r0})^2+(z_s-z_{r0})^2]^{1/2}$, $(\delta x_r, \delta y_r, \delta z_r)^T$ are the correction terms to nominal values $(x_{r0}, y_{r0}, z_{r0})^T$.

Note that the coefficients of $(\delta x_r, \delta y_r, \delta z_r)$ for pseudo-range and carrier phase observations are the same except for a scale factor $1/\lambda$. The coefficient for unknown ambiguity N is 1.

As was stated above, the double differencing (DD) of measurements from two receivers placed over a short baseline cancels receiver and satellite clock errors, and reduces the tropospheric, ionospheric and satellite orbital errors to a negligible level. The major errors left in DD observations are multipath and receiver measuring noise. This makes DD observations ideal for centimeter level real-time positioning and navigation.

Figure 4:
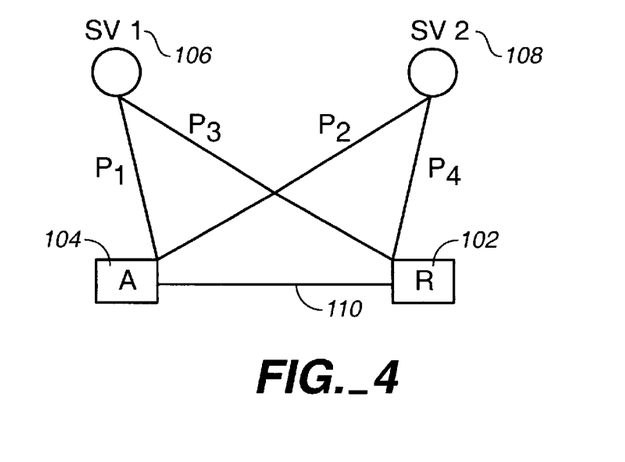
FIG. 4 depicts a four measurement geometry for two receivers and two satellites for a double-difference (DD) measurement.

Let's assume we have two receivers (104 and 102) observing two satellites (106 and 108) simultaneously over a short baseline (110), as shown in FIG. 4. A double difference (DD) observation is defined as:

$$\nabla\Delta p=(p_4-p_2)-(p_3-p_1). \qquad (17)$$

As shown in FIG. 4, point A (104) is a base station reference point and its coordinates are held fixed, i.e. $(\delta x_a, \delta y_a, \delta z_a)^T=0$. Point R (102) is a rover point and its coordinates are to be estimated.

Based on the DD definition given by Eqn. (17), the linearized DD observation equations for pseudo-range and carrier phase are easily obtained from Equations (15) and (16) as:

$$\nabla\Delta p=(a^2-a^1)\delta x_r+(b^2-b^1)\delta y_r+(c^2-c^1)\delta z_r+\nabla\Delta\rho_0+\nabla\Delta\epsilon_p; \qquad (18)$$

$$-\nabla\Delta\Phi=(1/\lambda)(a^2-a^1)\delta x_r+(1/\lambda)(b^2-b^1)\delta y_r+(1/\lambda)(c^2-c^1)\delta z_r+\nabla\Delta N^{21}+\nabla\Delta\rho_0/\lambda+\nabla\Delta\epsilon_\Phi; \qquad (19)$$

where $(\delta x_r, \delta y_r, \delta z_r, \nabla\Delta N^{21})$ are unknowns (state vector), $\nabla\Delta\rho_0=\rho_4^0-\rho_2-(\rho_3^0-\rho_1)$ is the computed DD range based on satellite coordinates, fixed base station coordinates located at point A and approximate rover R coordinates $(x_{r0}, y_{r0}, z_{r0})$.

The DD ambiguity, $\nabla\Delta N^{21}=N_4-N_2-(N_3-N_1)$, remains to be an integer in the formed carrier phase DD observation equation. If an approximate value $\nabla\Delta N_0^{21}$ for $\nabla\Delta N^{21}$ is known, the ambiguity term in (19) can be partitioned as $\nabla\Delta N^{21}=\nabla\Delta N_0^{21}+\delta\nabla\Delta N^{21}$., where $\delta\nabla\Delta N^{21}$ is the unknown ambiguity correction term to be estimated.

Suppose that m satellites are observed at epoch $t_k$. By differencing SV2, SV3, . . . , SVm against SV1, we could then form (m–1) independent DD pseudo-range observation equations and (m–1) independent DD carrier phase equations. In matrix form, the (m–1) DD pseudo-range observation equations can be written as:

$$r_{pk}(-)=H^p_k\delta x_k+\epsilon_{pk}; \qquad (20)$$

where $$H^p_k=(A_k, 0); \qquad (21)$$

$$r_{pk}(-)=\begin{vmatrix} \nabla\Delta p^{21}-\nabla\Delta\rho_0^{21} \\ \nabla\Delta p^{31}-\nabla\Delta\rho_0^{31} \\ ... \\ \nabla\Delta p^{m1}-\nabla\Delta\rho_0^{m1} \end{vmatrix}; \qquad (22)$$

$$A_k=\begin{vmatrix} a^2-a^1 & b^2-b^1 & c^2-c^1 \\ a^3-a^1 & b^3-b^1 & c^3-c^1 \\ ... & ... & ... \\ a^m-a^1 & b^m-b^1 & c^m-c^1 \end{vmatrix};$$

$$\delta x_k=(\delta x_r, \delta y_r, \delta z_r, \delta\nabla\Delta N^{21}, \delta\nabla\Delta N^{31}, ..., \delta\nabla\Delta N^{m1})^T. \qquad (23)$$

Comparing Equations (20), (22) and (23) with Kalman filter algorithms one can see that $r_{pk}(-)$ represents the predicted residuals for DD pseudo-range observations, $H^p_k$ is the design matrix for DD pseudo-range observations and $\delta x_k$ is the state corrections vector.

Similarly, (m–1) DD carrier phase observation equations can be written as follows:

$$r_{\Phi k}(-)=H^\Phi_k\delta x_k+\epsilon_{\Phi k}; \qquad (24)$$

$$H^\Phi_k=((1/\lambda)A_k, I); \qquad (25)$$

$$r_{\Phi k}(-)=\begin{vmatrix} -\nabla\Delta\Phi^{21}-\nabla\Delta\rho_0^{21}/\lambda-\nabla\Delta N_0^{21} \\ -\nabla\Delta\Phi^{31}-\nabla\Delta\rho_0^{31}/\lambda-\nabla\Delta N_0^{31} \\ ... \\ -\nabla\Delta\Phi^{m1}-\nabla\Delta\rho_0^{m1}/\lambda-\nabla\Delta N_0^{m1} \end{vmatrix}; \qquad (26)$$

Where I is the identity matrix of dimensions (m–1)×(m–1); $r_{\Phi k}(-)$ is the predicted residual vector for DD carrier phase observations; $H^\Phi_k$ is the design matrix; $(\nabla\Delta N_0^{21}, \nabla\Delta N_0^{31}, ..., \nabla\Delta N^{m1})$ are the best approximate a priori values available at this epoch for DD ambiguity parameters $(\nabla\Delta N^{21}, \nabla\Delta N^{31}, ..., \nabla\Delta N^{m1})$.

The DD measurement model for Kalman filter update at each observation epoch $t_k$ can be expressed as follows:

$$r_k(-) = H_k \delta x_k + \epsilon_k; \qquad (27)$$

$$Cov(\epsilon_k) = \begin{vmatrix} R_p & 0 \\ 0 & R_\Phi \end{vmatrix}; \qquad (28)$$

where $$r_k(-) = \begin{vmatrix} r_{pk}(-) \\ r_{\Phi k}(-) \end{vmatrix}; H_k = \begin{vmatrix} H_k^p \\ H_k^\Phi \end{vmatrix}; \epsilon_k = \begin{vmatrix} \epsilon_{pk} \\ \epsilon_{\Phi k} \end{vmatrix}; \qquad (29)$$

$R_p$ is the covariance matrix of DD pseudo-range observations; $R_\Phi$ is the covariance matrix of DD carrier phase observations.

For L1 single frequency RTK system, the Kalman filter state vector consists of rover GPS antenna position ($x_r$, $y_r$, $z_r$) and DD L1 carrier phase ambiguities ($\nabla\Delta N^{21}$, $\nabla\Delta N^{31}$, ..., $\nabla\Delta N^{m1}$). The DD ambiguity states in the Kalman filter are treated and estimated as real-valued (floating) numbers, even though they are integers in nature. This state vector is updated every epoch (typically once per second) by DD pseudo-range and carrier phase observations. The linearized observation model connecting state vector $x_k$ and the predicted residuals $r_k(-)$ is given by Equation (27), together with the covariance matrix of the observations in Equation (28). The design matrix related to DD code and phase observations is given by $H_k$ in Equation (29).

The transition matrix $\Phi_{k-1}$ for Kalman filter, which is used to predict the current state vector value based on the previous epoch state vector value according to Equation (2), can be assumed as an identity matrix for low dynamic kinematic GPS surveying tasks such as control surveying, topographic surveying and construction stakeout. Since DD carrier phase ambiguities are constant and integer in nature, an identity transition matrix for ambiguity states is a rigorous assumption. For position states ($x_r$, $y_r$, $z_r$) with a typical 1 Hz update rate, the linearization error in design matrix $A_k$ in Equation (22) can be made negligible by using the updated previous epoch rover antenna position. This means that the updated state vector values $x_{k-1}(+)$ (rover position and DD ambiguities) from the last epoch can be used as approximate (a priori) values at the current epoch to linearize the code and carrier phase measurement models, namely to compute the predicted residuals, $r_k(-)$, and the design matrix, $H_k$, as shown by Equation (29).

Figure 5:
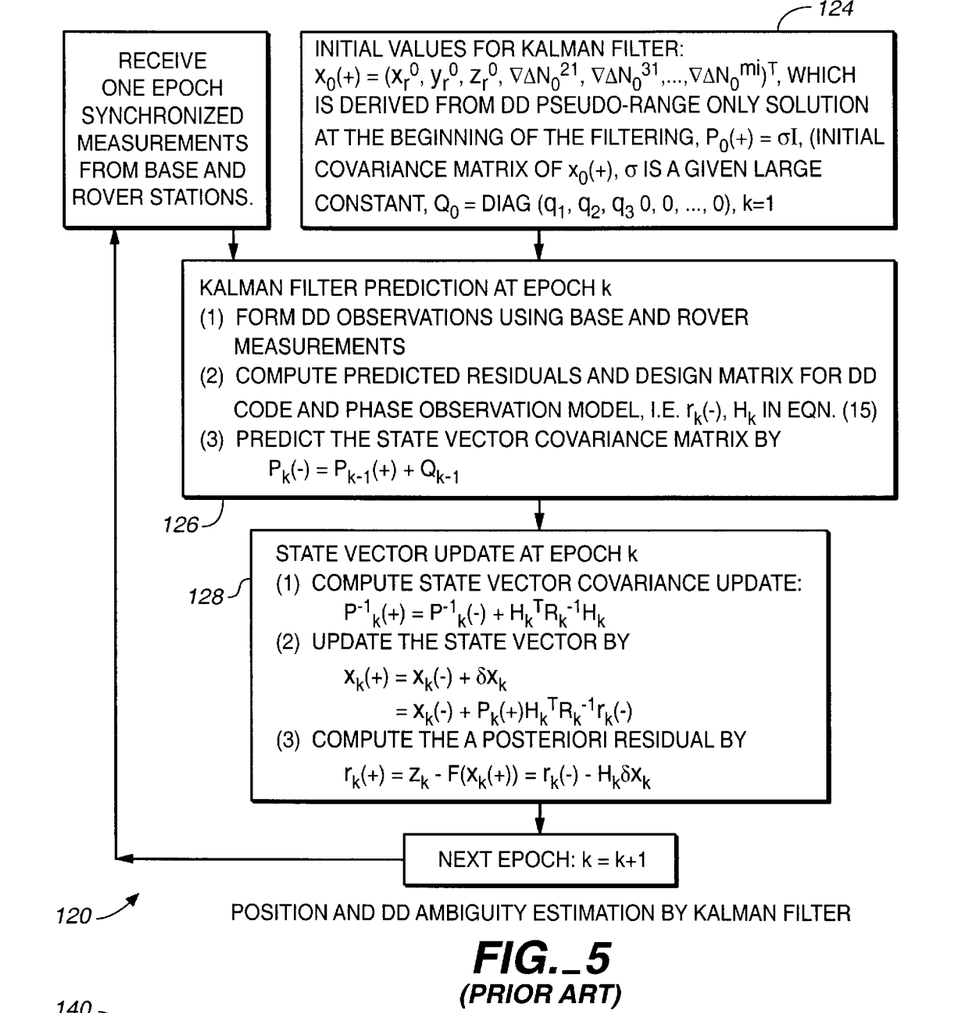
FIG. 5 shows the flow chart that summarizes the Kalman filter estimation of rover antenna position and DD carrier phase ambiguities in real-time positioning and navigation systems.

The flow chart (120) that summarizes the Kalman filter estimation of rover antenna position and DD carrier phase ambiguities in real-time positioning and navigation systems is depicted in FIG. 5.

The Kalman filter (at the step 128 of FIG. 5) provides a rover position estimate ($x_{rk}$, $y_{rk}$, $z_{rk}$) and real-valued (floating) DD ambiguity estimates ($\nabla\Delta N^{21}$, $\nabla\Delta N^{31}$, ..., $\nabla\Delta N^{m1}$) at every observation epoch. With a properly designed Kalman filter, the estimated floating DD ambiguities will converge very closely to their correct integer numbers after a long period of DD observation updates.

Typically, the long periods of DD observation updates may last in the range of 45 minutes to a few hours depending on satellite geometry and multipath errors in code and phase measurements. If this is the case, the rover position estimates have an accuracy of decimeter level.

With 8 to 15 minutes of observations on five or more satellites, each estimated floating DD ambiguity from the Kalman filter will normally converge toward its corresponding correct integers within ±3 cycles on L1 frequency. However, to achieve the centimeter level positioning accuracy in a relatively short time span, from 8 to 15 minutes, an ambiguity search to find the correct DD integer ambiguities should be undertaken.

The given above discussion of the DD observations can be found in the paper "High-Precision Real-Time GPS Positioning Concepts: Modeling and Results", given by N. C. Talbot and published in the Journal of Navigation, Vol. 38, No. 2, Summer 1991.

The purpose of ambiguity search is to find the correct DD carrier phase integer ambiguities so that DD carrier phase observations can be used as unambiguous precise ranges to determine the rover antenna positions at centimeter accuracy.

Since GPS L1 carrier wavelength is about 19.02 cm, the combined errors such as receiver measuring noise, multipath and remaining atmospheric errors and orbital errors should be less than a few centimeters on the formed DD carrier phase observations in order to reliably determine the correct integer ambiguities. For example, it would be impossible to figure out the correct L1 integer ambiguity if the errors in L1 DD phase observations are larger than half a cycle of L1 wavelength, i.e. 10 cm. This is the main reason why L1 RTK systems are used for cm-level positioning only within 10 km distance. Within such short distance as compared to the distance between the receiver and the satellite, atmospheric effects and orbital errors can be greatly reduced by double differencing. Thus, the ambiguity resolution is feasible for the base-rover distances in the range of (1–10) km.

Figure 6:
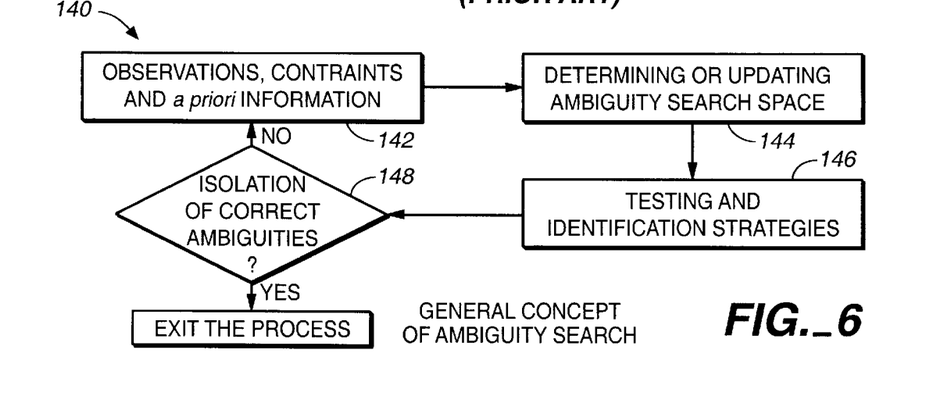
FIG. 6 depicts the ambiguity search concept.

The ambiguity search concept (140) is depicted in the flow chart of FIG. 6. The ambiguity search process starts at a certain epoch with DD pseudo-range and carrier phase observations, plus any a priori information and constraints available till the present search epoch (142). The ambiguity search space is constructed or updated (144). All the possible ambiguity combinations given in the ambiguity search space are tested by some acceptance or rejection criteria (146). If two or more ambiguity combinations satisfy the tests as potential correct candidates, the process is repeated using the next epoch observations until only one ambiguity combination, i.e. the correct one, is identified (148).

Figure 7:
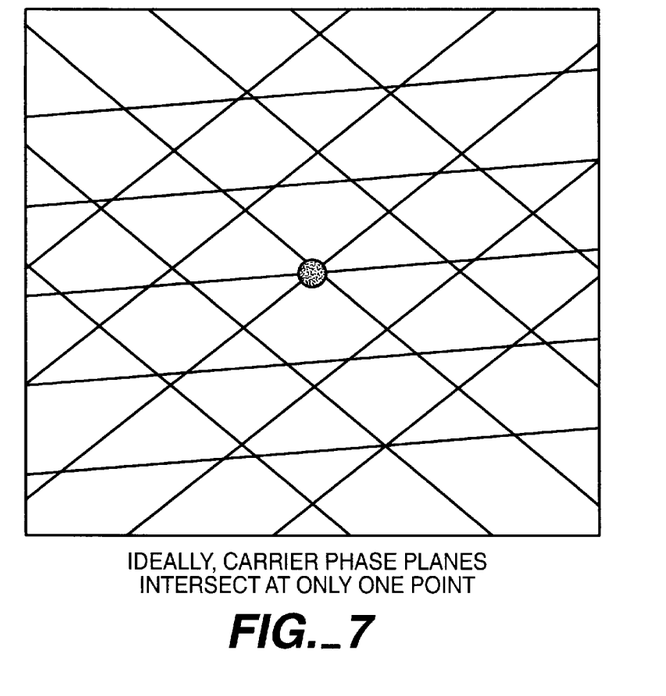
FIG. 7 illustrates an ambiguity search space when carrier phase planes intersect at only one point.
Figure 8:
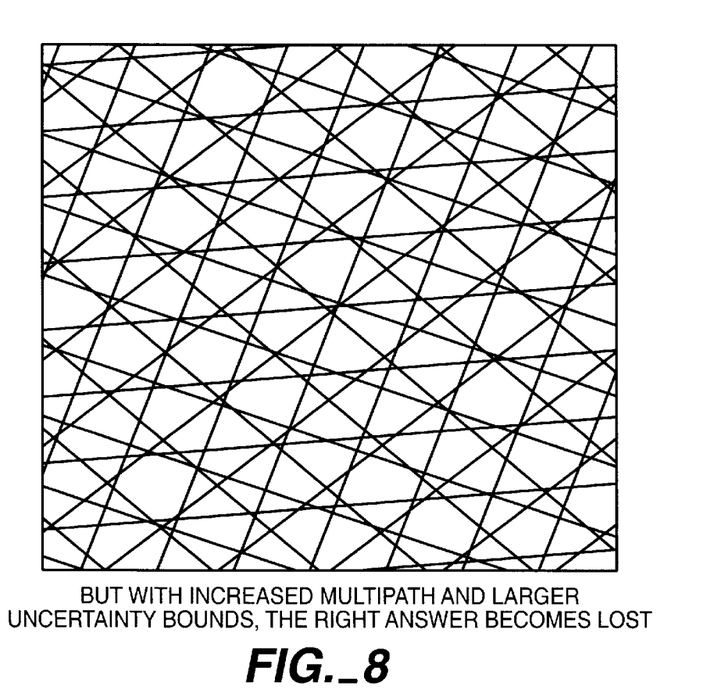
FIG. 8 shows an ambiguity search space when the true solution for the carrier phase ambiguity problem is hidden due to the large multipath and large uncertainty bounds.

Since the DD carrier phase ambiguities are integers in nature, the ambiguity search space is a discrete space which is defined by a collection to (a set) of combinations of integer ambiguities. FIGS. 7 and 8 illustrate an ambiguity search space.

As shown in FIG. 7, if no noise is present, the carrier phase planes intersect at only one point that yields the true carrier ambiguity integer solution. However, as depicted in FIG. 8, the multipath errors and the receiver's errors hide the true answer to the carrier ambiguity problem.

The Kalman filter (124) of FIG. 5 provides one with a real-valued DD ambiguity estimate, real $\nabla\Delta N'^{i1}$, for every ambiguity state. It is known, that the floating ambiguity estimate from the Kalman filter will be accurate within ±3 cycles to the true integer value after 8–15 minutes filtering. Therefore, there are seven integer numbers to be tested as possible ambiguity candidates $\{\nabla\Delta N'^{i1}-3, \nabla\Delta N'^{i1}-2, \nabla\Delta N'^{i1}-1, \nabla\Delta N'^{i1}, \nabla\Delta N'^{i1}+1, \nabla\Delta N'^{i1}+2, \nabla\Delta N'^{i1}+3\}$ for each DD ambiguity, where $\nabla\Delta N'^{i1}$ is the nearest integer value to real $\nabla\Delta N'^{i1}$.

To solve m ambiguity problems, one has to test the total $7^m$ combinations of integer ambiguities. In general, the maximum number of combinations of integer ambiguities to be tested is $S^m$, where S is the total number of possible integer candidates for each ambiguity unknown and m is the number of DD ambiguity unknowns.

In order to solve the carrier phase ambiguity problem in a real-time in a L1 single frequency OTF RTK system, two major problems have to be overcome. One problem is the computational speed for ambiguity searching and the other problem is the reliability problem, that is the evaluation of the probability of determining the correct integer ambiguities.

Obviously, the computational speed for search is largely related to the ambiguity search space, i.e. the number of possible combinations of integer ambiguities. The fewer the number of combinations to be tested, the lesser amount of computation time is required. One way to reduce the ambiguity search space is to use the Kalman filtering time-recursive approach of FIG. 5. The time-recursive process of FIG. 5 requires to update the Kalman filter prediction values (126) at every consecutive time epoch resulting in increased accuracy of the consecutive estimated floating ambiguities updates. When the rover unit moves with relatively low speed, it takes (8 to 15) minutes of DD observation updating to bring the floating ambiguity estimates within ±3 L1 cycles from their correct integer values. For example, in case of 6 satellites in view, the search space for 5 DD unknown ambiguities comprises $7^5=16,807$ combinations.

The next step to increase the speed of computations is to use the most efficient computational algorithms. One such algorithm is given by Don Knight in the paper "A New Method of Instantaneous Ambiguity Resolution" at the ION-GPS-94 conference in September of 1994, who derived a fast mechanism of the root mean square (RMS) computation for the a posteriori carrier phase residuals. The search space normally comprises tens of thousands of integer combinations. However, with the rapid advancing of microprocessor technology and with the use of increasingly fast microprocessors in GPS receivers, the intensive computations needed for implementation of the Knight algorithm can be performed in real time needed for the real time kinematic (RTK) navigation.

The second problem, as was stated above, is the problem of increasing the reliability of the found solution for the carrier ambiguity problem in the L1 single frequency RTK systems. To test if an integer combination is a correct solution or not, it is advisable to examine the RMS (root mean square) of the a posteriori carrier phase residuals corresponding to each integer ambiguity combination in the constructed ambiguity search space.

Suppose, one wants to test one integer ambiguity combination $\Theta'_1=(\nabla\Delta N'^{21}, \nabla\Delta N'^{31}, \ldots, \nabla\Delta N'^{m1})$ to see if it is a potentially correct ambiguity combination. One way to do it is to replace the unknown integer ambiguity states $(\nabla\Delta N^{21}, \nabla\Delta N^{31}, \ldots, \nabla\Delta N^{m1})$ for (m−1) DD carrier phase observation equations (19) with the presumably known integer ambiguity combination $\Theta'_1=(\nabla\Delta N'^{21}, \nabla\Delta N'^{31}, \ldots, \nabla\Delta N'^{m1})$. The DD carrier phase observation equation (19) for (m−1) DD observations can be rewritten as follows:

$$-\nabla\Delta\Phi^{21}-\nabla\Delta N'^{21}-\nabla\Delta\rho_0^{21}/\lambda=(1/\lambda)(a^2-a^1)\delta x_r+(1/\lambda)(b^2-b^1)\delta y_r+(1/\lambda)(c^2-c^1)\delta z_r+\nabla\Delta\epsilon_{\Phi 21}; \quad (30)$$

$$-\nabla\Delta\Phi^{31}-\nabla\Delta N'^{31}-\nabla\Delta\rho_0^{31}/\lambda=(1/\lambda)(a^3-a^1)\delta x_r+(1/\lambda)(b^3-b^1)\delta y_r+(1/\lambda)(c^3-c^1)\delta z_r+\nabla\Delta\epsilon_{\Phi 31}; \quad (31)$$

$$-\nabla\Delta\Phi^{m1}-\nabla\Delta N'^{m1}-\nabla\Delta\rho_0^{m1}/\lambda=(1/\lambda)(a^m-a^1)\delta x_r+(1/\lambda)(b^m-b^1)\delta y_r+(1/\lambda)(c^m-c^1)\delta z_r+\nabla\Delta\epsilon_{\Phi m1}; \quad (32)$$

or in a matrix form:

$$r'_{\Phi k}(-) = (1/\lambda)A_k \begin{vmatrix} \delta x_r \\ \delta y_r \\ \delta z_r \end{vmatrix} + \epsilon_{\Phi k}; \quad (33)$$

where $A_k$ is the design matrix defined by Equation (22), $\lambda$ is the GPS carrier wavelength, $r'_{\Phi k}(-)$ is the predicted carrier phase residuals given integer ambiguity combination $\Theta'_1$, i.e.

$$r'_{\Phi k}(-) = \begin{vmatrix} -\nabla\Delta\Phi^{21}-\nabla\Delta N'^{21}-\nabla\Delta\rho_0^{21}/\lambda \\ -\nabla\Delta\Phi^{31}-\nabla\Delta N'^{31}-\nabla\Delta\rho_0^{31}/\lambda \\ \ldots \\ -\nabla\Delta\Phi^{m1}-\nabla\Delta N'^{m1}-\nabla\Delta\rho_0^{m1}/\lambda \end{vmatrix}. \quad (34)$$

If scaled by carrier wavelength $\lambda$, the terms $(-\nabla\Delta\Phi^{i1}-\nabla\Delta N'^{i1}, i=2, 3, \ldots, m)$ in equation (34) effectively define unambiguous DD carrier phase ranges corresponding to the integer ambiguity combination $\Theta'_1$.

There are only three position unknowns $(\delta x_r, \delta y_r, \delta z_r)^T$ remaining in Eqn. (33) because the integer ambiguities to be tested, $(\nabla\Delta N'^{21}, \nabla\Delta N'^{31}, \ldots, \nabla\Delta N'^{m1})$, are known and exact. It follows, that the unknown ambiguity correction term $(\delta\nabla\Delta N'^{21}, \delta\nabla\Delta N'^{31}, \ldots, \delta\nabla\Delta N'^{m1})^T$ is zero.

To solve for the three position unknowns $(\delta x_r, \delta y_r, \delta z_r)^T$, one needs at least three DD carrier phase observations in equation (33). If four or more DD carrier phase observation equations are available, equation (33) yields at least one or more redundant carrier phase observations. A least squares solution for the three position unknowns $(\delta x_r, \delta y_r, \delta z_r)^T$ can be obtained as follows:

$$\begin{vmatrix} x_r \\ y_r \\ z_r \end{vmatrix} = \begin{vmatrix} x_{r0} \\ y_{r0} \\ z_{r0} \end{vmatrix} + \begin{vmatrix} \delta x_r \\ \delta y_r \\ \delta z_r \end{vmatrix}; \quad (35)$$

with $$\begin{vmatrix} \delta x_r \\ \delta y_r \\ \delta z_r \end{vmatrix} = \lambda(A_k^T R_k^{-1} A_k)^{-1} A_k^T R_k^{-1} r'_{\Phi k}(-) \quad (36)$$

The a posteriori carrier phase residuals are then calculated as $$r'_{\Phi k}(+) = r'_{\Phi k}(-) - (1/\lambda)A_k \begin{vmatrix} \delta x_r \\ \delta y_r \\ \delta z_r \end{vmatrix}. \quad (37)$$

Here the unit of $r'_{\Phi k}(+)$ is in cycles.
The root mean squares (RMS) is defined as:

$$RMS(\Theta'_1)=sqrt(r'_{\Phi k}{}^T(+) R_k^{-1} r'_{\Phi k}(+)/(m-1)); \quad (38)$$

Where (m−1) is the number of DD observations.
The a posteriori carrier phase residuals $r'_{101\ k}(+)$ and therefore $RMS(\Theta'_1)$ are equal to zero if we have only three DD carrier phase observations in equation (33) (m=4). Positive non-zero RMS are obtained when four or more DD observations are available at each epoch, that is m is equal or to greater than 5.

The computed $RMS(\Theta'_1)$ are related to the chosen integer ambiguity combination $\Theta'_1=(\nabla\Delta N'^{21}, \nabla\Delta N'^{31}, \ldots, \nabla\Delta N'^{m1})$. If the tested integer ambiguity combination $\Theta'_1$ is the correct one, $(-\lambda\nabla\Delta\Phi^{i1}-\lambda\nabla\Delta N'^{i1}, i=2, 3, \ldots, m)$ represents the unambiguous true carrier phase ranges and the resultant a posteriori DD carrier phase residuals $r'_{\Phi k}(+)$ and $RMS(\Theta'_1)$ are within the error bound determined by carrier phase receiver noise, remaining atmospheric errors and phase multipath errors. Such errors on DD observations are usually less than 0.1~0.2 cycles over short baselines, depending on multipath conditions. If one gets a large value of RMS($\Theta'_1$) which exceeds the nominal error bound, one can conclude that at least one of the integer ambiguities in the tested ambiguity combination $\Theta'_1$ is incorrect and this ambiguity combination should then be rejected as the potentially correct candidate.

All the integer ambiguity combinations can be tested in the same way. The integer ambiguity combinations that produce small RMS values within the error bound are accepted as the potentially correct combinations. However, the integer ambiguity combinations that produce large RMS values outside the error bound should be rejected. More often than not, some integer ambiguity combinations that produce non-optimum RMS are have to be accepted due to the smaller number of redundant observations, large multipath errors and relatively short carrier wavelength (19.02 cm for GPS L1 single frequency RTK systems).

If this is the case, a ratio test between the second-smallest (or non-optimum) RMS and the smallest RMS can be made:

$$\text{ratio} = RMS(\Theta_{second\_min})/RMS(\Theta_{min}). \quad (39)$$

It is the believed, that only one integer ambiguity combination is the correct one and that this unique integer ambiguity combination yields the smallest RMS value.

To determine the unique integer ambiguity combination, one can use the following approach. If the ratio in Eqn. (39) is larger than a certain threshold, than the integer ambiguity combination corresponding to the smallest RMS value is the unique correct ambiguity combination. According to the paper "A New Method of Instantaneous Ambiguity Resolution" given by Don Knight at the ION-GPS-94 conference in September of 1994, the ratio threshold is 7.

However, if the ratio is less than the pre-set threshold, the ambiguity combination that yields the smallest RMS value is statistically indistinguishable among other ambiguity combinations that also yield comparable small RMS values. If this is the case, the ambiguity combinations from the prior epoch can be combined together with the observations obtained at the next following epoch and tested again. The RMS values corresponding to the same integer ambiguity combination and calculated from different epochs can be summed up in order to average the RMS values over the receiver noise and multipath errors which slowly change with time. The ratio can then be formed and tested by using the averaged RMS values relating to each ambiguity combination.

The described above prior art ambiguity search method suffers a few drawbacks as outlined below.

(1) In case of L1 GPS system, the number of redundant observations is not sufficient, therefore the described above RMS search procedure yields the wrong result, especially when the multipath noise is strong.

(2) The described above search procedure is a time-forward process, that is only current and future epoch observations are used. The DD carrier phase observations preceding the initial search epoch are not fully utilized in the ambiguity search procedure. By using only time-forward epochs of observations, the ambiguity resolution time, that is the time period needed to identify the correct integer ambiguities, is significantly increased.

The present invention overcomes these drawbacks and provides extremely high reliability of correct integer ambiguity resolution.

Referring back to FIG. 1, the data storage (31) including the data buffer (30) are provided in the rover unit (20) to utilize the new time-backward ambiguity resolution algorithm procedure in a single frequency RTK system.

The new time-backward ambiguity search and verification algorithm procedure utilizes the fact that only the RMS values corresponding to the correct integer ambiguities remain small for the time-backward stored epochs and the future epochs, and that the RMS values corresponding to the wrong integer ambiguity combinations grow and exceed the above described threshold for stored and future epochs.

Indeed, as the satellites move in space, the unambiguous DD carrier phase ranges $(-\lambda \nabla \Delta \Phi^{i1} - \lambda \nabla \Delta N^{i1}, i=2, 3, \ldots, m)$ change. If sufficient satellite movement has been accumulated between the stored epochs and the current epochs, the DD carrier phase ranges derived from the wrong integer ambiguity combinations for at least four DD phase observations utilizing the invented time-backward procedure will no longer intersect in one point thus producing large RMS values.

The proposed data storing mechanism and the time-backward ambiguity search and verification algorithm optimally uses the satellite geometry change information introduced by satellite movements over a certain period of time in order to reliably determine the correct integer ambiguities among the many possible candidates.

Figures 9, 9B:
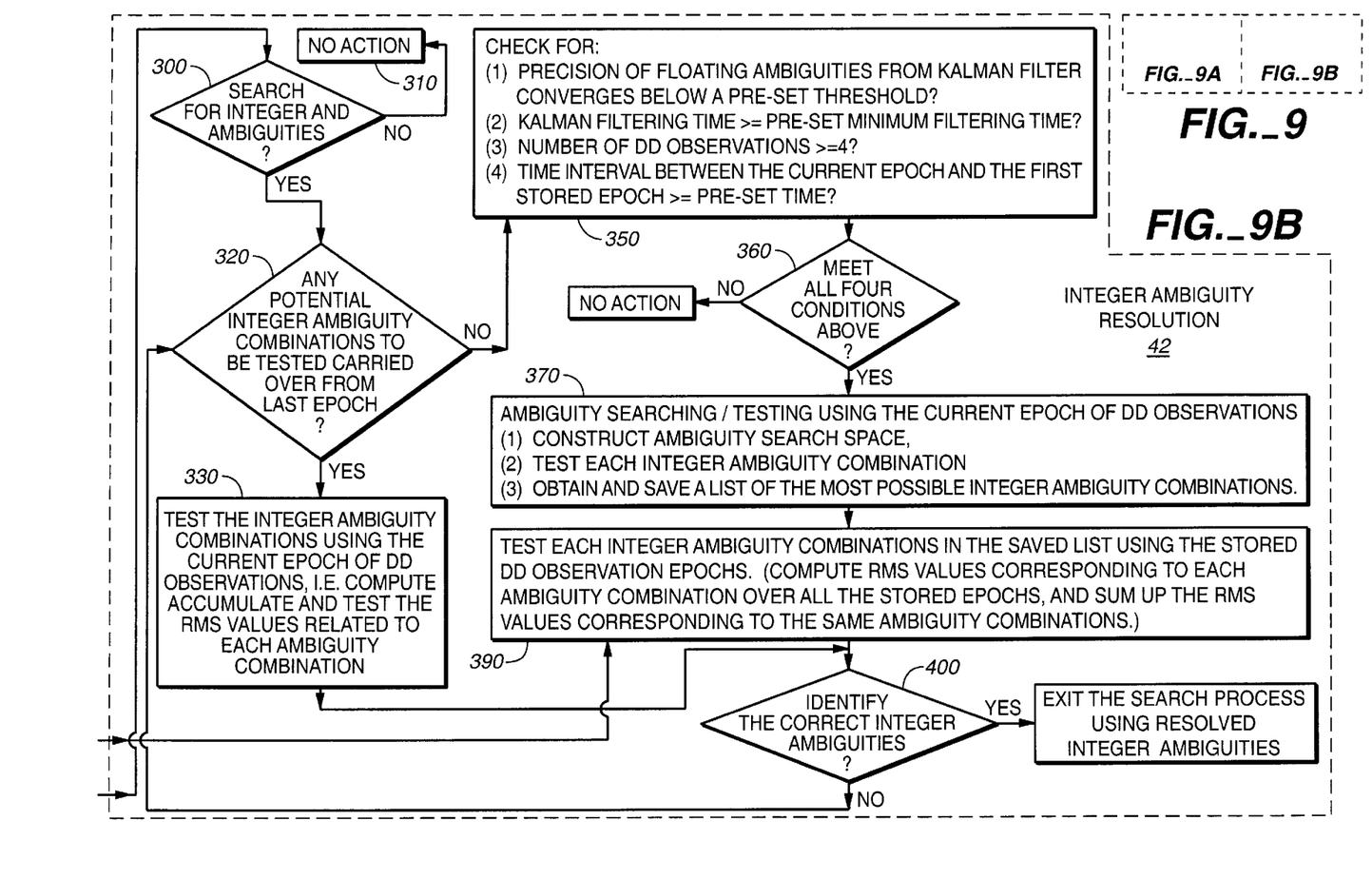
FIG. 9 depicts the flow chart that shows how the new time-backward algorithm is implemented in the single frequency on-the-fly (OTF) real time kinematic(RTK) systems.
Figure 9A:
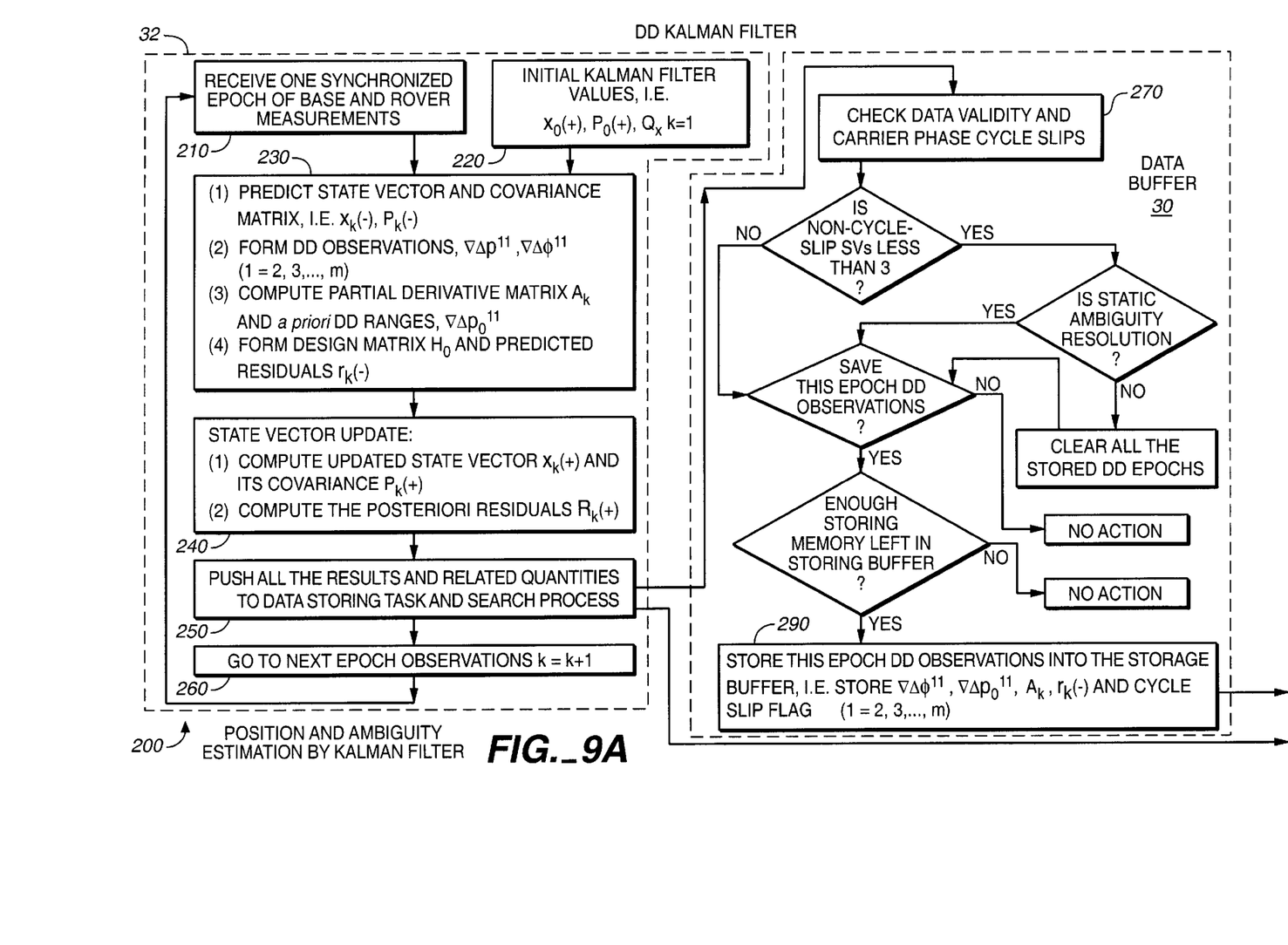

FIG. 9 depicts the flow chart (200) that shows how the new time-backward algorithm is implemented in the single frequency on-the-fly (OTF) real time kinematic (RTK) systems.

The data storing procedure using the data buffer (30 of FIG. 9 and 30 of FIG. 1) and the integer ambiguity procedure utilizing the algorithm processor (42 of FIG. 9 and 42 of FIG. 1) are separated from the DD Kalman filtering procedure using the DD Kalman filter (32 of FIG. 9 and 32 of FIG. 1).

In more detail, after receiving one synchronized epoch of base and rover measurements (block 210 of FIG. 9), and after initializing the Kalman filter values, i.e. $x_0(+)$, $P_0(+)$, $Q_k$, k=1 (block 220 of FIG. 9), the Kalman filter: (1) predicts state vector and covariance matrix, i.e. $x_k(-)$, $P_k(-)$; (2) forms DD observations, $\nabla \Delta p^{i1}$, $\nabla \Delta \Phi^{i1}$ (i=2, 3, ..., m); (3) computes partial derivative matrix $A_k$ and a priori DD ranges, $\nabla \Delta \rho_0^{i1}$; (4) forms design matrix $H_k$ and predicts residuals $r_k(-)$ as shown in block 230 of FIG. 9.

Next, the Kalman filter updates the state vector by: (1) computing updated state vector $x_k(+)$ and its covariance $P_k(+)$; and (2) computing the a posteriori residuals $r_k(+)$ as shown in block 240 of FIG. 9.

Next, the Kalman filter pushes all the results and related quantities to data storing processor and to the ambiguity search processor (block 250 of FIG. 9).

Thus, the DD Kalman filtering procedure provides rover antenna positions, floating ambiguity estimates and other necessary quantities to the data storing procedure and to the integer ambiguity procedure.

At each epoch, the carrier phase DD observations and other related quantities are fed to the data storage circuit (31 of FIG. 1).

The data storing algorithm checks (block 270 of FIG. 9) the data validity and the time interval between the current epoch and the last stored DD epoch. The data storing algorithm also checks the carrier phase cycle slips between the current epoch and the stored epochs. The validity check is necessary for ambiguity resolution in the kinematic mode because the backward ambiguity testing and verification is possible only for continuously tracked satellites whose ambiguities are the same for all stored and current epochs.

Indeed, only for static mode, cycle slips can be easily repaired. For dynamic mode, the cycle slips on all satellites interrupt the backward algorithm and the satellites lock should be reacquired before the whole procedure is repeated again from the very beginning.

If check data validity is passed, at a specified epoch interval, the data storing procedure stores away (block 290 of FIG. 9) the current epoch DD carrier phase observations and the related quantities until the data storage buffer is full.

As can be seen from equations (30–32), one needs to store only $\nabla\Delta\Phi^{i1}$, $\nabla\Delta\rho_0^{i1}$, $A_k$, $x_k(-)$ and cycle slip flags for ambiguity search purposes (block 290 of FIG. 9). One alternative would be to store the raw carrier phase measurements, cycle slip flags, $x_k(-)$ and the satellite positions. But this would lead to re-computation of the partial derivative matrix $A_k$ when this particular epoch is back-processed by the ambiguity search processor. To make the search computation as efficient as possible in a real-time RTK system, it is desirable to store the $A_k$ matrix already available from the Kalman filtering task.

As was mentioned above, the time interval between two consecutively stored epochs and the size of the data memory buffer can be set to different values based on the requirements of the receiver hardware. In the preferred embodiment, the time interval between the consecutive stored epochs is set within the range (5–10) seconds in order to average the multipath errors in carrier phase measurements. More frequent storing of the data, at 1 or 2 second interval, may result in over-sampling of the multipath error.

The ambiguity search algorithm (42 of FIG. 1 and of FIG. 9) is triggered every epoch after the Kalman filter has updated the state vector (block 240 of FIG. 9).

When sufficient filtering on each ambiguity state has been reached and the time span between the first stored epoch and the current measurement epoch is larger than a pre-set value, the ambiguity search is carried out at the current epoch. The ambiguity search algorithm obtains a list of possible integer ambiguity combinations by examining the computed RMS values based on the current epoch DD carrier phase observations. Then, each integer ambiguity combination in the list is further tested using the previously stored DD carrier phase observation epochs. The RMS values corresponding to the same integer ambiguity combination computed based on stored epochs as well as the current epoch are summed up. If there is sufficient satellite movement accumulated between the current epoch and the stored epochs, the accumulated RMS value related to the correct integer ambiguity combination remains small and becomes discernible with the large RMS values corresponding to the incorrect integer ambiguity combinations. If the discernibility, i.e. the ratio between the smallest RMS value and the second smallest RMS value, is not sufficiently large, the further testing and accumulation of RMS values using following epochs of observations can be carrier out.

In more detail, we first check if any potential integer ambiguity combinations are carried over from the last epoch. If none, we go to a complete ambiguity search from the beginning. Otherwise, it is a continuation of the ambiguity search process from the last epoch and the potential ambiguity combinations from the last epoch are further tested using the current epoch of DD observations. That is, the RMS values related to each ambiguity combination are computed, accumulated and tested. See block 330 of FIG. 9.

To start the initial ambiguity search, the ambiguity search algorithm checks whether: (1) the precision of floating ambiguities from Kalman filter converges below a pre-set threshold (2) Kalman filtering time>=pre-set minimum filtering time (3) number of DD observations>=4 (4) Time interval between the current epoch and the first stored epoch>=pre-set time (Block 350 of FIG. 9.)

If all four above conditions are met, the ambiguity search algorithm using the current epoch of DD observations: (1) constructs the ambiguity search space; (2) tests each integer ambiguity combination (block 370 of FIG. 9); and (3) builds a list of the most likely integer ambiguity combinations.

Lastly, the ambiguity search algorithm tests each integer ambiguity combinations in the saved list using the stored DD observation epochs, by computing the RMS values corresponding to each ambiguity combination over all stored epochs and by summing up the RMS values corresponding to the same ambiguity combinations. (Block 390 of FIG. 9).

If the rover receiver is stationary (static), a static position constraint can be further applied to the determination of the correct ambiguity combination. This means that the positions derived from different epochs using the same integer ambiguity combination should be within a few centimeter bound defined by DD carrier phase positioning accuracy.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An on-the-fly real-time kinematic (OTF-RTK) system for use with the satellite positioning system (SATPS) comprising:

a base including a base SATPS satellite navigation receiver and a base measurement means, said base being placed in a fixed location with known coordinates, said base configured to receive SATPS satellite signals from said SATPS satellite system, configured to perform single frequency base code and carrier phase measurements on said SATPS satellite signals, and configured to transmit results of said single frequency base code and carrier phase measurements;

a rover unit including a rover SATPS satellite navigation receiver and a rover measurement means, said rover unit configured to receive SATPS satellite signals from said SATPS satellite system, configured to receive results of said single frequency base code and carrier phase measurements from said base having known location coordinates, and configured to perform single frequency rover unit code and carrier phase measurements on said SATPS satellite signals;

a Double-Difference (DD) Kalman Filter configured to receive at each epoch results of said base single frequency code and carrier phase measurements and results of said rover unit single frequency code and carrier phase measurements, said base and said rover measurements being synchronized at each epoch, configured to calculate single frequency DD code phase and DD carrier phase quantities, configured to perform Kalman filtering operation on said DD code phase quantities and on said DD carrier phase quantities;

a storage device including a storage buffer, said storage device configured to receive and to store in said storage buffer at a specified epoch interval said single frequency DD carrier phase quantities starting at an epoch corresponding to the beginning of the measurements and ending at an epoch when said storage buffer is full;

a time-backward integer ambiguity resolution algorithm processor configured to perform an integer ambiguity search utilizing current and stored single frequency DD carrier phase quantities in order to determine said rover's position fix and integer ambiguities; wherein said time-backward integer ambiguity resolution algorithm processor utilizes the root mean square (RMS) computation for the stored carrier phase residuals RMS values corresponding to the correct integer ambiguities that remain small for the time-backward stored epochs and the future epochs; and a navigation computer configured to provide a user with near-continuous position estimates of said rover unit with centimeter-level accuracy.

2. The system of claim 1, wherein said base includes a base GPS satellite navigation receiver, and wherein said base is configured to receive GPS satellite signals from said GPS satellite system, and wherein said rover unit includes a rover GPS satellite navigation receiver, and wherein said rover unit is configured to receive GPS satellite signals from said GPS satellite system.

3. The system of claim 1, wherein said base includes a base GLONASS satellite navigation receiver, and wherein said base is configured to receive GLONASS satellite signals from said GLONASS satellite system, and wherein said rover unit includes a rover GLONASS satellite navigation receiver, and wherein said rover unit is configured to receive GLONASS satellite signals from said GLONASS satellite system.

4. The system of claim 1, wherein said base includes a base combined GPS_GLONASS satellite navigation receiver, and wherein said base is configured to receive both GPS and GLONASS satellite signals simultaneously from said GPS and GLONASS satellite systems, and wherein said rover unit includes a rover combined GPS and GLONASS satellite navigation receiver, and wherein said rover unit is configured to receive both GPS and GLONASS satellite signals simultaneously from said GPS and GLONASS satellite systems.

5. The system of claim 2, further comprising:
a transmitter connected to said base, said base transmitter configured to transmit said single frequency base code and carrier phase measurements to said rover unit;
a communication receiver connected to said rover unit, said communication rover receiver configured to receive said single frequency base code and carrier phase measurements; and
a communication link between said base and said rover unit for communicating said single frequency code and carrier phase measurement from said base to said rover unit.

6. The system of claim 2, further comprising:
a datum transformation circuit connected to said navigation computer in said rover unit, said datum transformation circuit configured to generate centimeter-level accurate position fixes in a local coordinate format from said near-continuous position estimates of said rover unit; and
an ellipsoid-to-geoid conversion circuit connected to said datum transformation circuit, said ellipsoid-to-geoid conversion circuit configured to generate locally corrected height information from said near-continuous position estimates of said rover unit.

7. An on-the-fly real-time kinematic (OTF-RTK) system for use with the satellite positioning system (SATPS) comprising:
a rover unit including a rover SATPS satellite navigation receiver and a rover measurement means, said rover unit configured to receive SATPS satellite signals from said SATPS satellite system, configured to receive results of single frequency base code and carrier phase measurements from a base having known location coordinates, and configured to perform single frequency rover unit code and carrier phase measurements on said SATPS satellite signals;
a Double-Difference (DD) Kalman Filter configured to receive at each epoch results of said base single frequency code and carrier phase measurements and results of said rover unit single frequency code and carrier phase measurements, said base and said rover measurements being synchronized at each epoch, configured to calculate single frequency DD code phase and DD carrier phase quantities, configured to perform Kalman filtering operation on said DD code phase quantities and on said DD carrier phase quantities;
a storage device including a storage buffer, said storage device configured to receive and to store in said storage buffer at a specified epoch interval said single frequency DD carrier phase quantities starting at an epoch corresponding to the beginning of the measurements and ending at an epoch when said storage buffer is full;
a time-backward integer ambiguity resolution algorithm processor configured to perform an integer ambiguity search utilizing current and stored single frequency DD carrier phase quantities in order to determine said rover's position fix and integer ambiguities; wherein said time-backward integer ambiguity resolution algorithm processor utilizes the root mean square (RMS) computation for the stored carrier phase residuals RMS values corresponding to the correct integer ambiguities that remain small for the time-backward stored epochs and the future epochs; and
a navigation computer configured to provide a user with near-continuous position estimates of said rover unit with centimeter-level accuracy.

8. The system of claim 7, wherein said rover unit includes a rover GPS satellite navigation receiver, and wherein said rover unit is configured to receive GPS satellite signals from said GPS satellite system.

9. The system of claim 7, wherein said rover unit includes a rover GLONASS satellite navigation receiver, and wherein said rover unit is configured to receive GLONASS satellite signals from said GLONASS satellite system.

10. The system of claim 7, wherein said rover unit includes a rover combined GPS_GLONASS satellite navigation receiver, and wherein said rover unit is configured to receive GPS_GLONASS satellite signals simultaneously from GPS and GLONASS satellite systems.

11. The system of claim 8, further comprising:
a communication receiver connected to said rover unit, said communication rover receiver configured to receive said single frequency base code and carrier phase measurements; and
a communication link between said base and said rover unit for communicating said single frequency code and carrier phase measurement from said base to said rover unit.

12. The system of claim 8, further comprising:
a datum transformation circuit connected to said navigation computer in said rover unit, said datum transformation circuit configured to generate centimeter-level accurate position fixes in a local coordinate format from said near-continuous position estimates of said rover unit; and
an ellipsoid-to-geoid conversion circuit connected to said datum transformation circuit, said ellipsoid-to-geoid conversion circuit configured to generate locally corrected height information from said near-continuous position estimates of said rover unit.

13. A method for on-the-fly real-time kinematic (OTF-RTK) position estimation of a rover unit, said method comprising the steps of:

receiving SATPS satellite signals from a SATPS satellite system by a base SATPS receiver, said base being placed in a fixed location with known coordinates;

performing single frequency code and carrier phase measurements at said base;

transmitting results of said single frequency base code and carrier phase measurements from said base to said rover unit;

receiving SATPS satellite signals from said SATPS satellite system at said rover unit;

receiving, at said rover, results of said single frequency base code and carrier phase measurements;

performing single frequency code and carrier phase measurements at said rover unit;

calculating at each synchronized epoch single frequency DD code phase quantities and single frequency DD carrier phase quantities;

performing Kalman filtering on said DD code and carrier phase quantities;

receiving and storing at a storage device including a storage buffer at a specified epoch interval said DD carrier phase quantities starting at an epoch corresponding to the beginning of the measurements and ending at an epoch when said storage buffer is full;

performing an ambiguity search by using said current and said stored DD carrier phase quantities in order to determine a position fix and integer ambiguities for said rover unit; and providing a user with near-continuous position estimates of said rover unit with centimeter-level accuracy by utilizing a navigation computer.

14. The method of claim 13, wherein said step of receiving and storing at said storage device including said storage buffer at said specified epoch interval said DD carrier phase quantities further includes the step of:

checking at said specified epoch interval the data validity and carrier phase cycle slips.

15. The method of claim 13, wherein said step of performing said ambiguity search by using said current and said stored DD carrier phase quantities in order to determine a position fix and integer ambiguities for said rover unit further comprises the steps of:

checking whether ambiguity search conditions are satisfied;

starting the ambiguity search if each said ambiguity condition is satisfied;

obtaining a list of possible integer ambiguity combinations;

testing each said integer ambiguity combination in said list of possible integer ambiguity combinations using said current and said stored DD carrier phase quantities; and identifying a true integer solution by comparing the best integer number with the next best integer number.

16. A method for on-the-fly real-time kinematic (OTF-RTK) position estimation of a rover unit, said method comprising the steps of:

receiving SATPS satellite signals from a SATPS satellite system at said rover unit;

receiving, at said rover, results of single frequency base code and carrier phase measurements;

performing single frequency code and carrier phase measurements at said rover unit;

calculating at each synchronized epoch single frequency DD code phase quantities and single frequency DD carrier phase quantities;

performing Kalman filtering on said DD code and carrier phase quantities;

receiving and storing at a storage device including a storage buffer at a specified epoch interval said DD carrier phase quantities starting at an epoch corresponding to the beginning of the measurements and ending at an epoch when said storage buffer is full;

performing an ambiguity search by using said current and said stored DD carrier phase quantities in order to determine a position fix and integer ambiguities for said rover unit; and providing a user with near-continuous position estimates of said rover unit with centimeter-level accuracy by utilizing a navigation computer.

17. The method of claim 16, wherein said step of receiving and storing at said storage device including said storage buffer at said specified epoch interval said DD carrier phase quantities further includes the step of:

checking at said specified epoch interval the data validity and carrier phase cycle slips.

18. The method of claim 16, wherein said step of performing said ambiguity search by using said current and said stored DD carrier phase quantities in order to determine a position fix and integer ambiguities for said rover unit further comprises the steps of:

checking whether ambiguity search conditions are satisfied;

starting the ambiguity search if each said ambiguity condition is satisfied;

obtaining a list of possible integer ambiguity combinations;

testing each said integer ambiguity combination in said list of possible integer ambiguity combinations using said current and said stored DD carrier phase quantities; and identifying a true integer solution by comparing the best integer number with the next best integer number.

* * * * *